Dec. 15, 1970     R. D. ROBERTS     3,548,396
BEARING TEMPERATURE SENSING DEVICE
Filed Jan. 17, 1968     2 Sheets-Sheet 1

INVENTOR.
Robert D. Roberts
BY Hill, Sherman, Meroni, Gross & Simpson  ATTORNEYS INVENTOR.
Robert D. Roberts united States Patent Office 3,548,396
Patented Dec. 15, 1970

3,548,396
BEARING TEMPERATURE SENSING DEVICE
Robert D. Roberts, Streetsboro, Ohio, assignor to Houdaille Industries Inc., Buffalo, N.Y., a corporation of Delaware
Filed Jan. 17, 1968, Ser. No. 698,449
Int. Cl. G08b 17/00
U.S. Cl. 340—231                                                4 Claims

ABSTRACT OF THE DISCLOSURE

A bearing temperature sensing device including a fitting which is adapted to be detachably secured to a bearing assembly, a thermistor secured within the fitting, with resistance sensing means arranged to detect changes in electrical resistance of the thermistor upon changes in temperature, together with indicator means responsive to the sensing means to indicate the existence of a predetermined temperature, and adjustment means remote from the fitting and functioning to adjust the temperature level at which the indicator becomes operative.

BACKGROUND OF THE INVENTION

Field of the invention

This invention is in the field of temperature sensing devices for bearing assemblies using an electrical sensor element whose resistance varies as a function of temperature, and electrical circuit means for providing an indication of the development of an excess temperature, and permitting adjustment of the temperature at which the indicator functions.

DESCRIPTION OF THE PRIOR ART

There are presently some devices available for sensing the temperature conditions of bearings from remote locations. However, these sensors usually make use of thermostat elements or thermocouple elements as the sensing means. Thermostatic elements are deficient in that they are not adjustable and are not particularly accurate. Thermocouple sensors are considerably more accurate, but their very low output (measured in millivolts) requires the use of transmission lines and shielding to transmit their signal to a remote location. This substantially increases the cost of such devices.

The present invention overcomes these difficulties by providing a bearing temperature sensing assembly which is sufficiently accurate for control purposes without requiring expensive signal transmitting systems. The triggering point of the sensor can be adjusted from a remote location and a single type of sensor element can be employed in bearing assemblies whose maximum permissive temperature might range from 100 to 500° or so. The interchangeability of sensing elements and the relative simplicity of the signal transmitting system make the new system considerably less expensive to install and operate.

SUMMARY OF THE INVENTION

The present invention uses a temperature sensing element consisting of a thermistor which has a negative temperature co-efficient, that is, it decreases in resistance with increasing temperature. The range of resistance is monitored by an electronic resistance sensing device which is provided with an adjustment means to change the level of resistance at which the indicating device of the circuit will operate. The indicating device may be a warning light or an audible signal or the like. By providing a means for adjusting the level at which the indicating device is operative from its remote station, an identical series of temperature sensing elements can be used in all of the bearings to be monitored at the control panel, regardless of the maximum temperature which is to be sensed in each.

DESCRIPTION OF THE PREFERRED EMBODIMENTS

Figure 1:
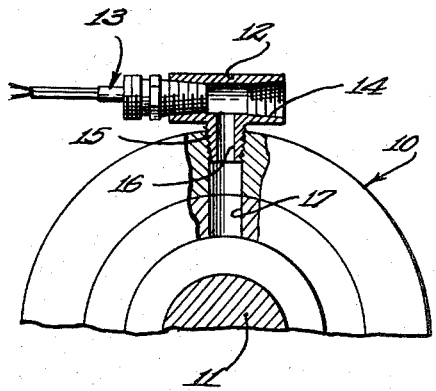
FIG. 1 is a view partly in elevation and partly in cross-section-illustrating one type of bearing temperature sensing device which can be employed in accordance with the present invention.
Figure 2:
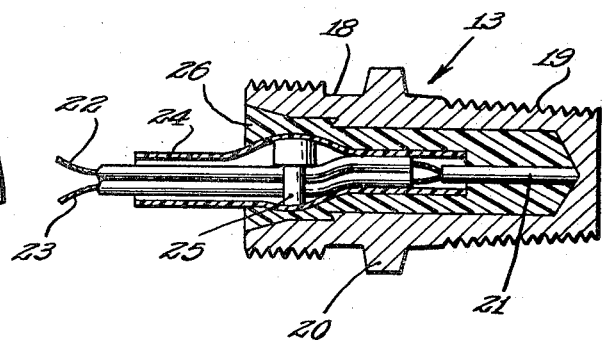
FIG. 2 is a somewhat enlarged sectional view of the sensing element alone as shown in FIG. 1.

Turning now to the drawings, in FIG. 1, reference numeral 10 indicates generally a bearing housing in which a shaft 11 is journaled for rotation. The device shown in FIGS. 1 and 2 is actually a combined temperature sensor and lubrication inlet, and consists of a T fitting 12 which in one leg of the T receives a temperature sensing device generally indicated at reference numeral 13, and the other leg 14 is used for the introduction of a lubricant into the bearing assembly. The T fitting 12 has an externally threaded leg 15 received in threaded engagement in the bearing housing 10, and has an axial bore 16 delivering the lubricant to a registering bore 17 in the bearing housing.

As best seen in FIG. 2, the temperature sensor 13 may consist of a nipple 18 having a tapered threaded end portion 19 arranged to be received in the leg of the T fitting 12. A hexagonal collar 20 integrally formed on the nipple 18 is provided to accommodate a wrench used in threading the nipple 18 securely within the T fitting 12.

The actual temperature sensing of the device is accomplished through the use of a thermistor 21 having a pair of insulated leads 22 and 23 which are electrically connected to the resistance sensing device later to be described. The leads are secured to the leads extending from the thermistor 21 by means of a tie wrap 25. The sensor assembly is securely anchored within the hollow interior of the nipple 18 by a deposit 26 of a potting compound such as an epoxy resin.

Figure 3:
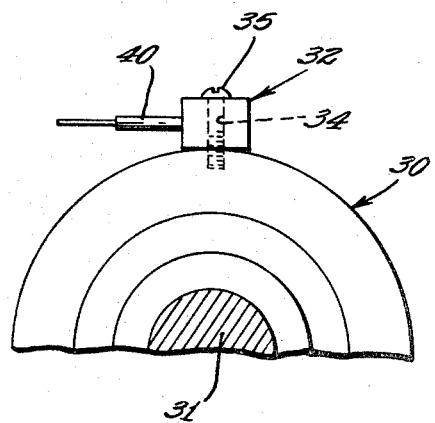
FIG. 3 is a view of a modified form of the invention in which the temperature sensing means is applied to the periphery of the bearing assembly.
Figure 4:
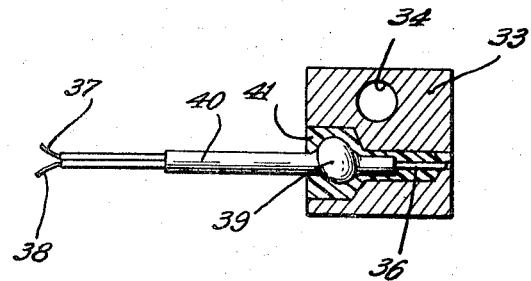
FIG. 4 is a cross-sectional view on an enlarged scale of the temperature sensor employed in FIG. 3.

In the form of the invention shown in FIGS. 3 and 4, a bearing housing 30 is shown surrounding a shaft 31 in which it is journaled. The temperature sensing device in this instance is illustrated at reference numeral 32 and, as best shown in FIG. 4, includes a housing 33 having a mounting hole 34 formed therein through which there is received a bolt 35 which secures the sensor assembly 32 to the housing 30. The sensing element in the assembly is a thermistor 36 which is joined to a pair of leads 37 and 38 through a tie wrap 39 contained within a piece of shrinkable plastic tubing 40. A deposit of potting compound 41 such as an epoxy resin is used to secure the electrical sensing elements within the housing 33.

Figure 5:
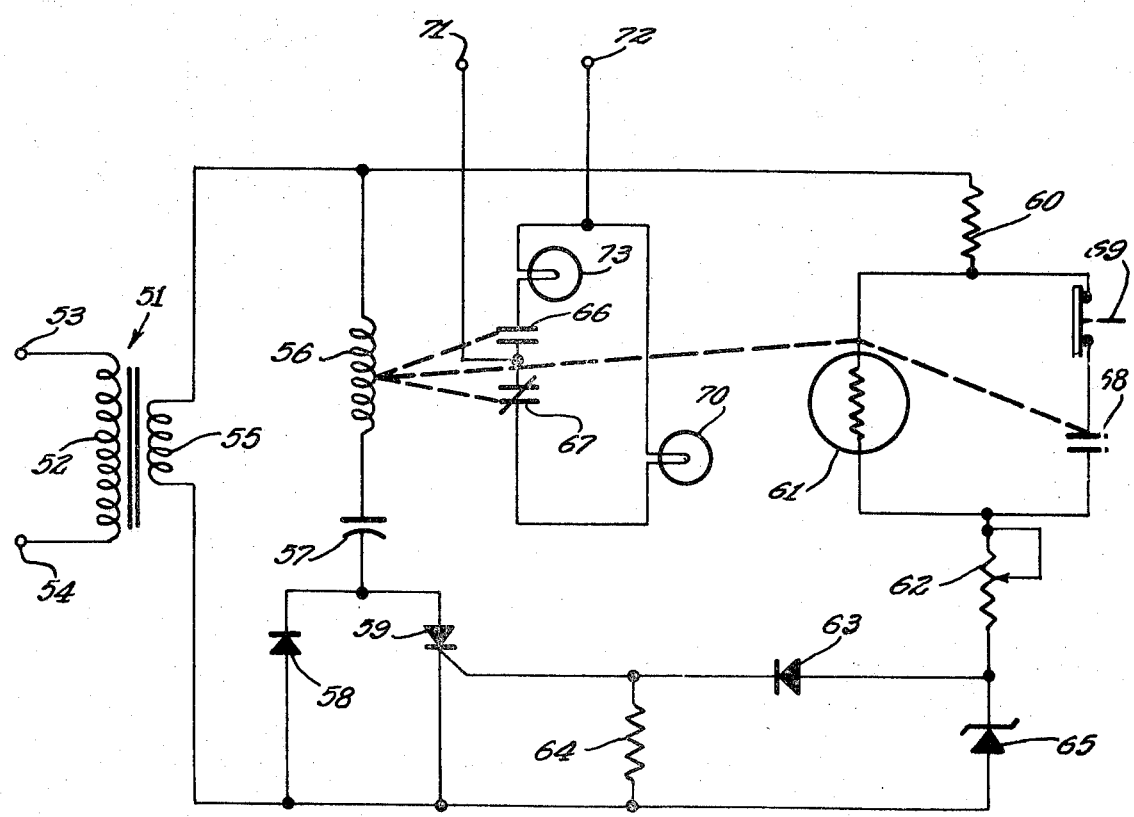
FIG. 5 is a circuit diagram of a resistance sensing device which can be employed with the sensor element shown in FIGS. 1 to 4, inclusive.

A suitable resistance sensing circuit embodying the thermistor sensing element has been illustrated in FIG. 5. A stepdown transformer 51 has its primary winding 52 connected to a suitable source of 120 volt alternating current by means of terminals 53 and 54. A secondary winding 55 applies a reduced alternating current voltage across an alternating relay coil 56, a capacitor 57 and a parallel combination of a diode 58 and a silicon controlled rectifier 59. Half wave pulses continuously pass through the relay coil 56 in the direction permitted by the diode 58, but the relay coil 56 does not become energized by these half wave pulses.

The silicon controlled rectifier 59 is triggered from a voltage divider network including a resistor 60, the thermistor sensing element 61, a potentiometer 62, a diode 63 and a resistor 64. Typically, the resistor 60 has a resistance value of about 5600 ohms, the potentiometer has a maximum resistance of about 180,000 ohms, and the resistor 64 has a resistance of about 1200 ohms. A reference diode such as a Zener diode 65 is employed to limit the voltage applied to the gate of the silicon controlled rectifier 59.

As the resistance of the thermistor element 61 decreases due to an increase in temperature, more voltage is applied across the resistor 64 to a point where there is current flow through the gate-cathode junction of the silicon controlled rectifier 59. This action causes conduction of the silicon controlled rectifier 59 during positive half cycles applied to the anode thereof, thereby causing a full alternating current signal to be applied across the relay coil 56 and thereby energizes the relay.

Energization of the relay coil 56 serves to close a pair of normally open contacts 66, to open a pair of normally closed contacts 67, and to close a pair of normally open contacts 68. The latter is in series with a normally closed reset switch 69, the combination of the contacts 68 and the reset switch 69 being in parallel with the thermistor element 61. Closing of contacts 68 insures that the thermistor element 61 is out of the circuit and applies a continuous voltage across the diode 65 and the resistor 64 sufficient to maintain the silicon controlled rectifier 59 conductive.

Before energization of the relay coil 56, i.e., before the temperature is reached at which the silicon controlled rectifier 59 becomes conductive, an indicator light 70 is energized through the normally closed relay contact 57 from a pair of terminals 71 and 72 leading to a suitable source of alternating current voltage. Energization of the light 70 thereby indicates that the bearing temperature is below the particular temperature being sensed. When the thermistor element 61 has sensed a sufficiently high temperature, however, and the silicon controlled rectifier 59 is conductive to the point of energizing the relay coil 56, a warning light 73 is then energized through the then closed contacts 66, indicating that the limiting temperature has been reached. The combination of the reset switch 69 and the closed relay contacts 68 provides a holding circuit which maintains the warning light 73 energized even though the thermistor element 61 may drop in temperature at a subsequent time. Thus, the operator is given an indication that the preselected temperature has been exceeded in the bearing. It is only through pressing the reset button 69 that the thermistor element 61 is again injected into the circuit to resume its temperature sensing function.

Adjustment of the potentiometer 62 serves to adjust the level at which the silicon controlled rectifier 59 becomes conductive. The potentiometer 62 can be located at a part remote from the bearing and makes it possible for any given thermistor sensor element 61 to be operable over a wide range of temperatures.

The diode 63, connected in series with the gate-cathode junction of the silicon controlled rectifier 59 is a protective device to prevent reverse current flow from anode to gate of the silicon controlled rectifier 59, and thereby prevents damage to the rectifier.

It will be understood that various modifications can be made to the described embodiments without departing from the scope of the present invention.

I claim as my invention:

1. A bearing temperature sensing device comprising a support means adapted to be detachably secured to a bearing assembly, a thermistor secured within said support means, a resistance sensing circuit including a relay having a coil, means for supplying said relay coil with half wave pulses, a gating device connected to said relay coil, means connecting said thermistor to said gating device whereby said relay coil is energized with half wave pulses of opposite polarity from the aforementioned pulses upon energization of the gating device by increased current flow through said thermistor, and indicator means operable by said relay upon energization of said gating device.

2. The device of claim 1 in which said gating device is a silicon controlled rectifier.

3. The device of claim 2 which includes a diode in parallel with said silicon controlled rectifier, the parallel combination of said diode and said silicon controlled rectifier being connected in series with said relay coil.

4. The device of claim 1 which includes a holding circuit for maintaining said indicator means energized upon decrease in temperature in said thermistor.

References Cited

UNITED STATES PATENTS

| | | | |
|---|---|---|---|
| 2,399,036 | 4/1946 | Jones | 340—231 |
| 2,501,715 | 3/1950 | Ferguson | 340—231X |
| 2,961,875 | 11/1960 | Reumund | 340—231X |

OTHER REFERENCES

Whitaker et al., Dif Pub. of Ser. No. 601,146, filed Dec. 12, 1966, published in 862 O.G. 22, on May 6, 1969.

THOMAS B. HABECKER, Primary Examiner

P. PALAN, Assistant Examiner

U.S. Cl. X.R.

307—252; 340—228, 332